United States Patent Office 2,887,439
Patented May 19, 1959

2,887,439

PALATABLE ANTIHISTAMINE TABLET

Oscar Klioze, Floral Park, and Jerome T. Liebrand, Brooklyn, N.Y., assignors to Chas. Pfizer & Co., Inc., New York, N.Y., a corporation of Delaware No Drawing. Application September 28, 1956
Serial No. 612,880

3 Claims. (Cl. 167—82)

This invention relates to pharmaceutical compositions and processes for their preparation. More particularly, it concerns rapidly disintegrable, pleasant-tasting tablets containing certain antihistamines. These dosage formulations are especially designed to treat and prevent conditions in humans of nausea, vomiting and vertigo, as well as colds and hay fever; but they can also be utilized for the same type of conditions in animals.

A particularly important field for antihistamines, especially those of the water-insoluble type, is in combating motion sickness. Antihistamines such as the dihydrochloride of 1-p-chlorobenzhydryl-4-m-methylbenzylpiperazine (also known as parachloramine hydrochloride and popularly termed meclizine hydrochloride) are especially effective and most frequently employed today for this purpose. Dosage formulations containing such antihistamines are also used to combat the symptoms of nausea and vomiting in pregnancy. They are employed, too, in the veterinary field. Lesser, but still important fields involve treatment of Ménière's syndrome, radiation sickness, cerebral arteriosclerosis, fenestration procedures, labyrinthitis and vestibular dysfunction. The usual dosage of meclizine hydrochloride for adult humans is 25–50 mg. per day, and for children, 12–25 mg. per day. Other water-insoluble antihistamines employed in this field are N-benzhydryl-N'-methyl piperazine hydrochloride and dimenhydrinate.

Another important utility for certain antihistamines, particularly those which are water-soluble, is in the treatment of colds and hay fever. These are generally pressor amines of the tetrahydrazoline type, such as thonzylamine, 2-(benzyl-(2-dimethylaminoethyl) amino) pyridine hydrochloride, 2-(benzhydryloxy)-N,N-dimethylethylamine hydrochloride, prophenpyridamine and chlorprophenpyridamine. The usual dosage is in the range of 10–200 mg. per day in one to four doses. This will vary somewhat with the activity of the individual compound, with the weight of the person being treated, and with the nature of the condition being treated.

Most of these antihistamines today are administered in the form of capsules or tablets. Elixirs, nose drops and sprays are also employed, but they frequently have the disadvantages of poor stability and of unpleasant taste or sensation. Also, especially in travelling, when the motion sickness remedies are most in demand, it is more difficult to pack and manage a liquid. Sometimes antihistamines are administered by injection, but the disadvantages of this method, especially for children, are well-known. Many tablets and capsules are not readily absorbed due to their inability to disintegrate at a sufficiently rapid rate. If they do disintegrate rapidly, then an unpleasant taste often results. Unfortunately, too, they are often a relatively large object for the consumer to swallow, and if inadvertently chewed or otherwise broken in the mouth, the unpleasant taste still results. This problem is particularly troublesome in the case of children and animals, where the administration of any medicament is often complicated and the provision of a pleasant-tasting, especially "candy-like" dosage is most desirable.

It is therefore, an object of this invention to provide an antihistamine-containing tablet which meets the deficiencies of ordinary tablets, capsules, and other dosage forms of this type. A further object is to provide a multi-purpose tablet of the character described, which may readily be swallowed whole, chewed without objectionable taste, dissolved in the mouth, or dissolved or suspended in liquids such as milk and fruit juices for administration to children, without the aftertaste characteristic of many ordinary preparations.

These and other objects are accomplished by the present invention, which provides a rapidly disintegrable, pleasant-tasting tablet comprising a plurality of compressed granules containing at least one antihistamine, and preferably a plurality of separate compressed granules containing sweetening agents and perhaps a filler, together with a flavoring agent and a hydrophilic starch in the interstices between such granules.

The tablets of this invention are prepared by first forming the granules by means of a suitable granulating technique, preferably by wet granulation. For this purpose, the medicaments are first thoroughly blended with a pharmacologically acceptable binding agent, and wet down with a solvent in an amount sufficient to render the mass suitable for passage through a granulating machine.

After formation of the granules, they may be dried simply by application of vacuum to the wet granules, or by blowing hot air through the mass during agitation. If desired, the air may be sterilized in any convenient manner, as by filtration and/or heat sterilization. The temperature of the air as it contacts the granules should be carefully regulated to avoid destruction or loss in potency of the therapeutic agents, a temperature from about 20 to 100° C., and preferably around 50° C., being satisfactory for most purposes. In some instances, a more elevated temperature may be employed if an inert gas such as nitrogen or carbon dioxide is used in lieu of air for drying purposes. Upon completion of the drying, the granules are preferably screened, to insure that they are of an optimum size for the formation of tablets. It has been found that granules ranging from about 20 to 100 mesh (U.S. Sieve Series) are most advantageous in preparing the tablets of this invention.

After drying and screening of all of the granules, they are blended together in the appropriate proportions for tabletting purposes. During this blending operation, other therapeutic agents which do not have too objectionable a taste may be added, care being taken not to introduce a large proportion of finely divided material, since this would impair the tabletting operation. It may be desired, for instance, to add minerals or vitamins already in granular form, such as vitamin C or vitamins of the B-complex, or gelatin-protected vitamins A and D which are available in the form of fine beadlets. Particularly in preparing formulations designed for the treatment of nausea conditions due to pregnancy, it is frequently desirable to add vitamin B6. This may be incorporated in separate granules, or most conveniently included in either the antihistamine-containing granules or the sweetener-containing granules. Other agents which may be employed are dyes and conventional diluents, excipients and fillers.

It is especially critical at this stage to blend in a hydrophilic starch, particularly potato, tapioca and rice starch. These materials in the interstices between the granules act as disintegrants for the finished tablet. Since they are hydrophilic, they swell greatly and facilitate rapid disintegration of the tablet upon contact with liquids or saliva, in effect exploding the tablet. A wetting agent for this starch may also be used to speed blending. It is an important feature of this invention to include also in the final blending operation suitable flavoring agents which together with the hydrophilic starch become dispersed in the interstices between the blended granules in the ultimate tablet. In this manner, the flavoring agent is made promptly available upon disintegration of the tablet so that any objectionable taste of the antihistamines and other components is promptly and effectively masked. Upon completion of the blending operation, the material is subjected to tabletting in the usual manner, preferably with the addition of a lubricant, such as stearic acid or magnesium stearate, to form a finished tablet containing a predetermined quantity of antihistamine per unit dosage form.

Besides the flavoring agent in the interstices between the granules, it is preferred, as above described, to incorporate sweetening agents in separate granules that disintegrate more rapidly than those containing the antihistamines. Both natural and synthetic sweetening agents such as saccharin and the sodium salt thereof, and sodium cyclohexyl sulfamate (Sucaryl) may advantageously be employed. The synthetic sweetening agents have been found to be most effective in masking the objectionable taste of the therapeutic agents. The pharmacologically acceptable binders for the antihistamine granules may themselves constitute sweetening agents, thus serving a dual purpose. For instance, various sugars and sugar alcohols are particularly advantageous, e.g. mannitol, sorbitol, lactose and sucrose.

A wide variety of natural and synthetic edible gums are also suitable as binding agents in the preparation of the aforesaid granules. While the natural gums are quite useful, it is preferred to employ certain synthetic gums due to their more uniform properties and binding characteristics. A particularly advantageous synthetic gum is polyvinylpyrrolidone (PVP), a high molecular weight polymer formed by the polymerization of vinylpyrrolidone by methods well known in the art. This product is commercially available under the trademark "Plasdone." For the purposes of this invention, polyvinylpyrrolidone having a K value ranging from about 26 to 36 is especially useful. The K value expresses the degree of polymerization of the polyvinylpyrrolidone, and is calculated from the relative viscosity or ratio of the viscosity of a dilute solution of PVP (such as a 1% solution) to the viscosity of the solvent i.e., water. A preferred form of polyvinylpyrrolidone exhibits a K value of 30, corresponding to an average molecular weight of 40,000. Other synthetic gums which may be employed for the purposes described are carboxymethylcellulose (CMC) and salts thereof, such as sodium carboxymethylcellulose; methyl cellulose; and certain polycarboxylic acid derivatives sold under the trademark "Carbopol" by the B. F. Goodrich Company. Among the natural gums which may be employed are pectin, acacia, agar, tragacanth and the alginates, such as sodium alignate.

The pharmacologically acceptable binding agent is applied to the antihistamines in an inert solvent, such as water or suitable organic solvents. It is important that the solvent be one which does not adversely affect the therapeutic agents to be mixed therewith. The lower alkanols, such as ethanol, butanol and isopropanol, are particularly useful for this purpose, and mixtures thereof with water are also suitable. In addition halogenated hydrocarbons like carbon tetrachloride and ethylene dichloride may be employed to advantage.

When separate sweetening agent-containing granules are used, granulation is most readily effected if a mixture of water and a lower alkanol solvent is employed for wetting the mass. A 66% w./v. solution of isopropanol in water has been found to be especially useful in this connection. After preparation of the granules, they are dried in the manner previously indicated, and screened.

This invention is illustrated by the following examples, it being understood, however, that the invention is not to be limited thereby, since many other modifications and embodiments may be made without departing from the spirit and scope thereof.

A series of blends was prepared with the following ingredients in the proportions by weight specified:

Portion A: Milligrams/tablet
   Ingredient—Meclizine hydrochloride [1]____ 25.500
Portion B:
   Mannitol _____ 160.800
   Sodium Sucaryl _____ 8.000
   Sodium saccharin _____ 3.200
Portion C:
   Rice starch _____ 45.000
   Raspberry flavor _____cc__ 0.0015
   Silica gel _____ 10.000

[1] Representing 2% overage and based on material of 100% purity.

Portion A was thoroughly wetted down with a 66% isopropanol-water solution. The wetted material was passed through 3/32 inch holes in a rotary wet pack granulator of the Colton type and then air-dried at 50° C. for 12 hours. The dried blend was then passed through a 20-mesh stainless steel screen in an oscillating granulator, retaining all granules that passed through a 30-mesh screen on a separator of the Sweco type. Coarser material was regranulated.

Portion B was thoroughly blended, milled through a high-speed comminuting machine and reblended for 10 minutes. One-fourth of this was then wetted with 66% isopropanol-water solution, in the same manner as portion A, and then passed through a 20-mesh screen in the oscillating granulator. Fines that passed through a 100-mesh screen on the separator were recycled.

The remaining three-fourths of this blended portion B was granulated in the same manner as the first one-fourth and mixed with sufficient of a 1.5% w./v. aqueous solution of FD&C red dye number 4 to give 0.061 mg. of the dye per finished tablet.

The rice starch of portion C was blended with the flavoring agent, adding the latter in small portions and blending 10 minutes after each addition. This blend was milled through the high-speed comminuting machine and then mixed with the silica gel. Portions A, B and C were then combined and blended for 5 minutes. Magnesium stearate, to provide 2.550 mg. per tablet, was then blended in and the final mixture was punched into tablets.

The round red tablets so prepared were pleasant-tasting and disintegrated rapidly upon introduction to the mouth or to other fluids. It was found that they were readily chewed, or swallowed without chewing, since the rapid disintegration upon introduction to the mouth promoted the flow of digestive juices which in turn facilitated swallowing of the tablets. Upon shaking in a test tube at 37° C. the tablets completely disintegrated in less than 5 minutes.

What is claimed is:

1. A rapidly disintegrable, palatable tablet comprising a plurality of compressed granules containing a water-insoluble antihistamine, a plurality of separate compressed granules containing a sweetening agent in a pharmacologically acceptable binder selected from the group consisting of sugars and sugar alcohols, and dispersed in the interstices between said granules a flavoring agent and a hydrophilic starch adapted to swell rapidly on contact with water, thereby disintegrating said tablet.

2. A rapidly disintegrable, palatable tablet comprising a plurality of compressed granules containing a total of about 25 mg. of meclizine hydrochloride, a plurality of separate compressed granules containing a sweetening agent, bound therewithin by a sugar alcohol, and dispersed in the interstices between said granules a flavoring agent and a hydrophilic starch adapted to swell rapidly on contact with water, thereby disintegrating said tablet.

3. A process for preparing rapidly integrable, palatable tablets which comprises granulating an antihistamine, separately granulating a sweetening agent with a pharmacologically acceptable binding agent, commingling all of the resulting granules with a flavoring agent and a hydrophilic starch, and compressing the resulting blend into tablets.

References Cited in the file of this patent

UNITED STATES PATENTS 2,410,417   Andersen _____ Nov. 5, 1946

OTHER REFERENCES

Remington's Practice of Pharmacy, 9th ed., the Mack Publ. Co., Easton, Pa., 1948, p. 1289.

Silver et al.: "Manuf. of Compressed Tablets," F. J. Stokes Machine Co., Phila., 1944, pp. 5, 23 and 59.

Modern Drug Encyl., 6th ed., Drug Publ., Inc., N.Y.C., 1955, p. 159.

U.S. Dispensatory, 25th ed., J. B. Lippincott Co., Phila., 1955, p. 784.